April 30, 1935.  C. H. THORDARSON  1,999,580
DYNAMO ELECTRIC MACHINE
Filed Feb. 16, 1932   7 Sheets-Sheet 2
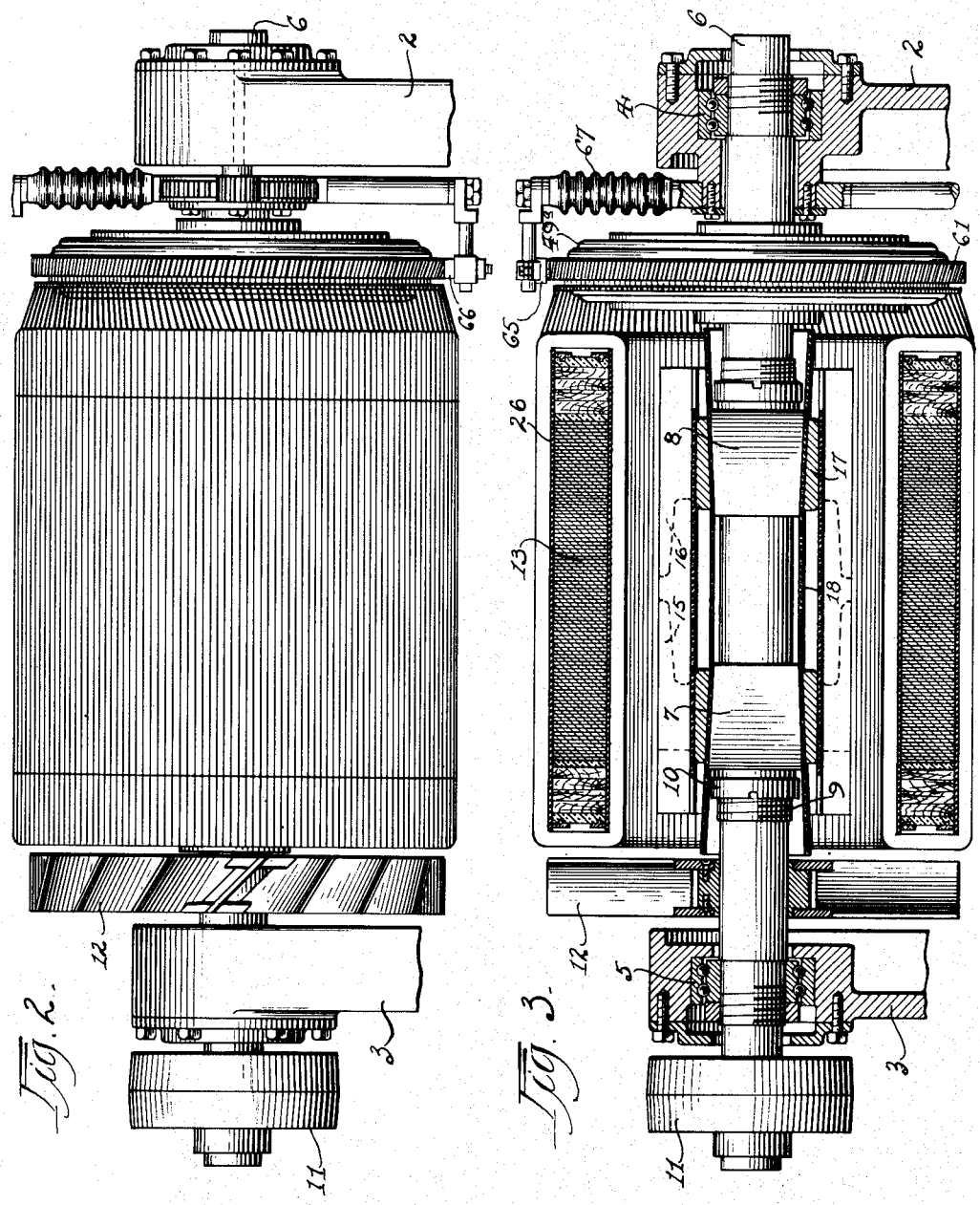
Inventor:
Chester H. Thordarson,
By Darby & Darby
Attorneys.

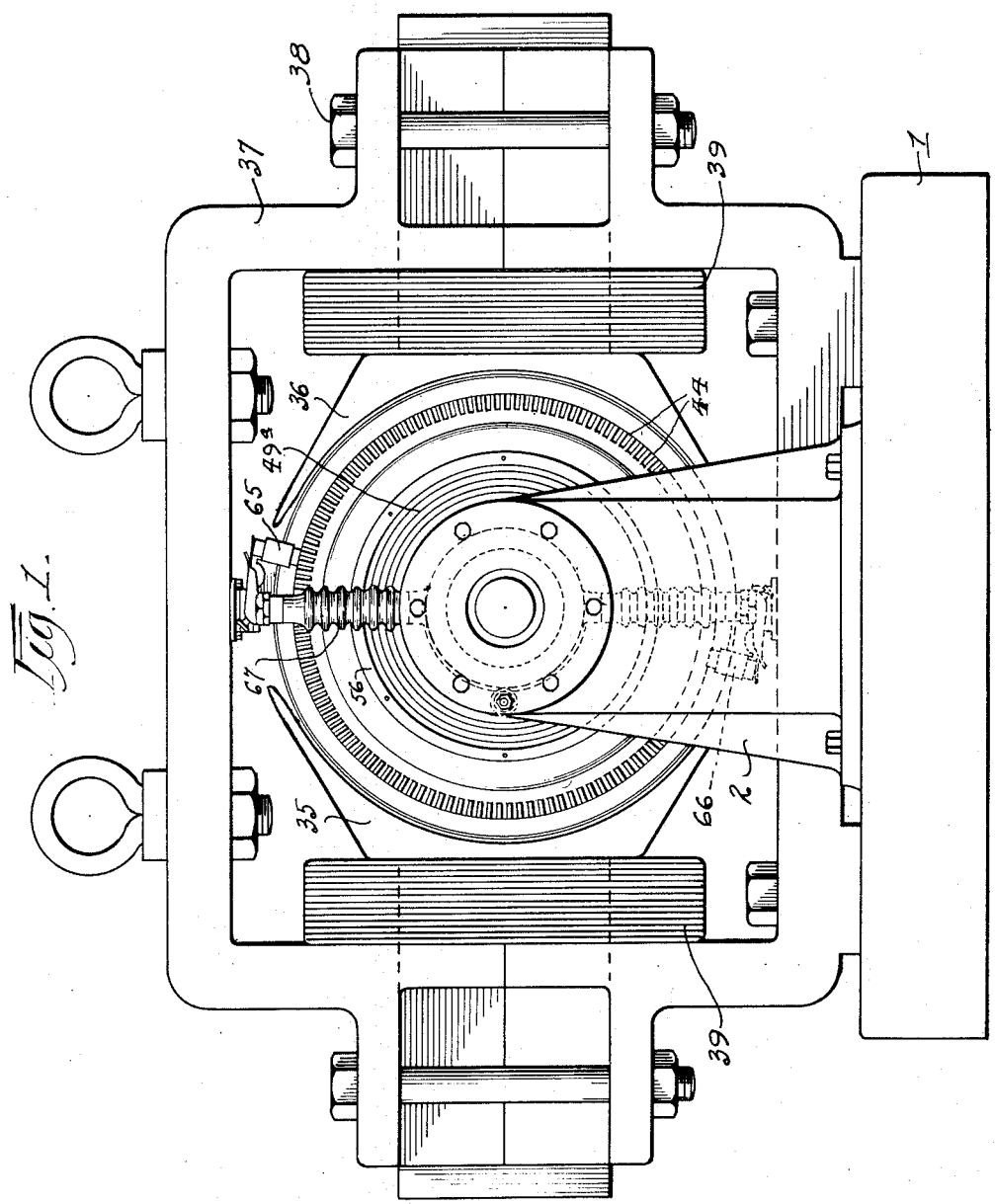

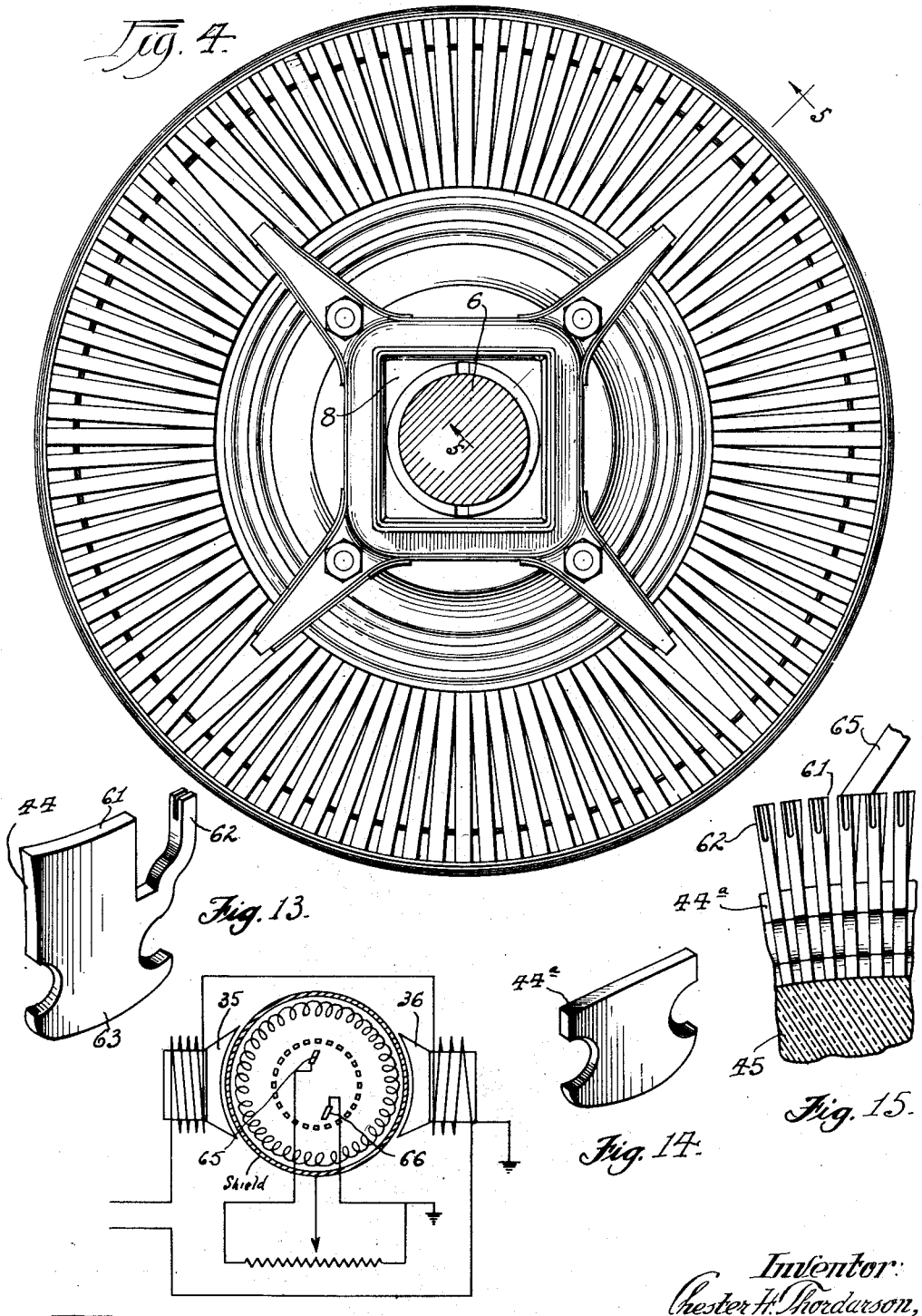

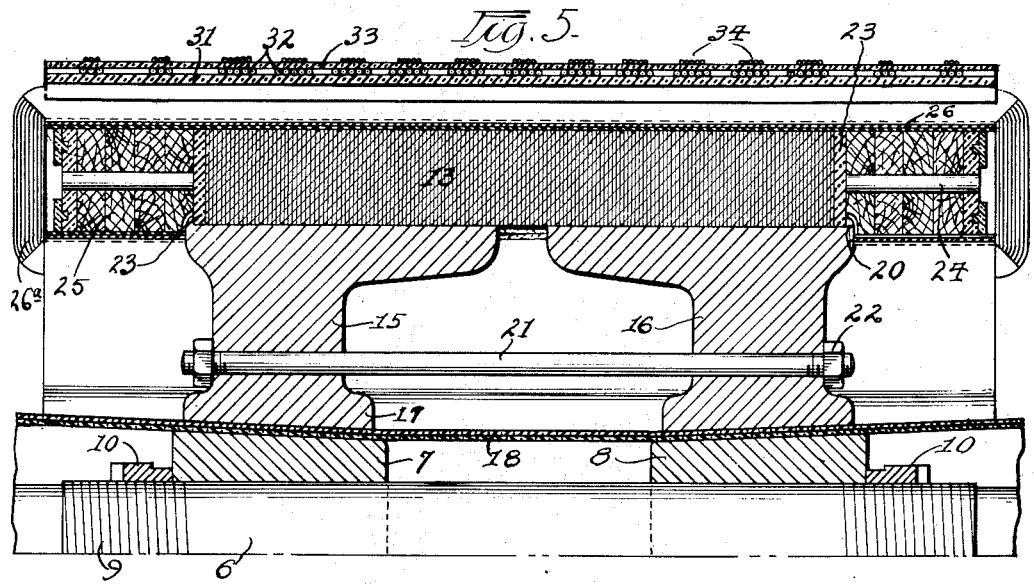

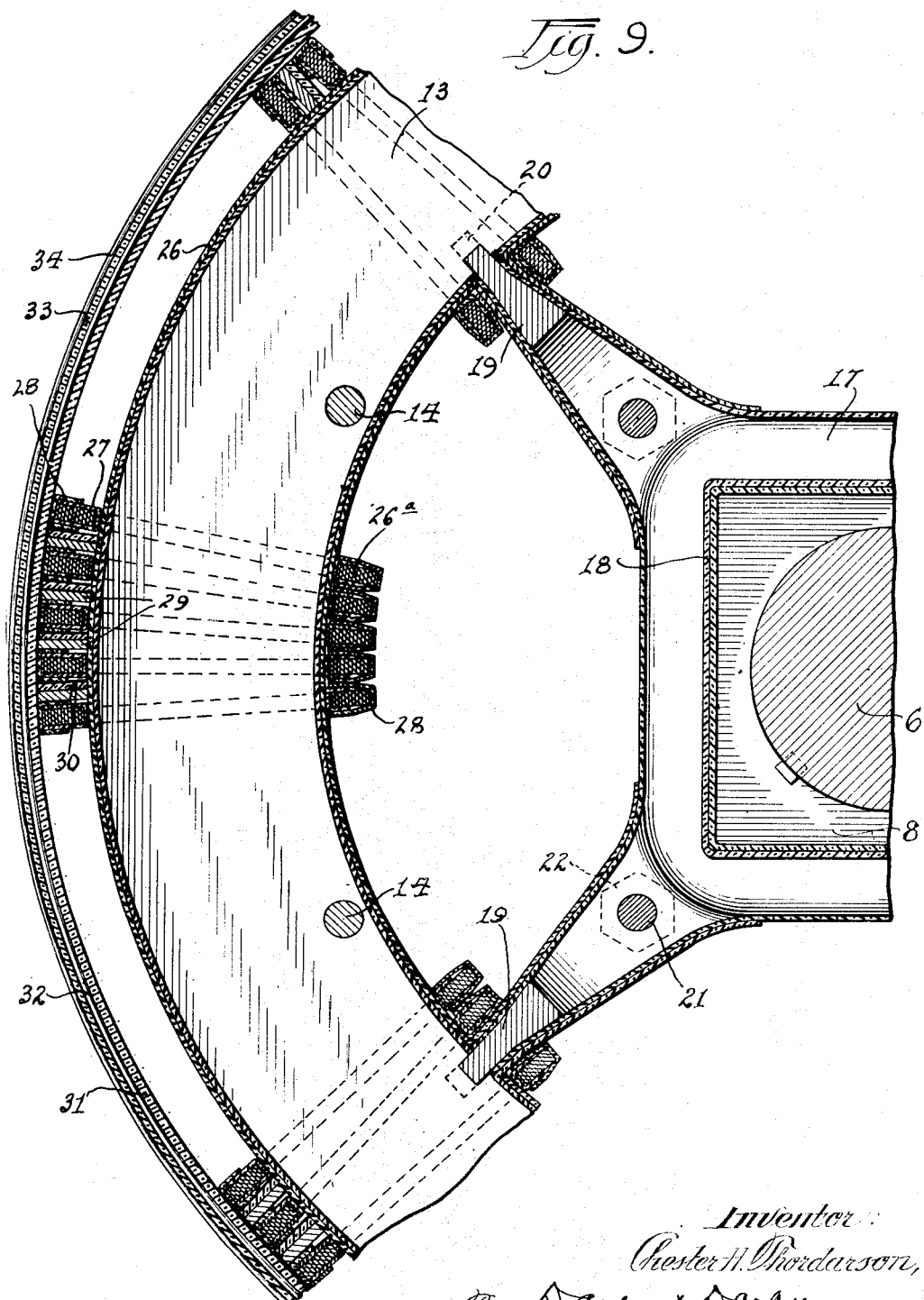

April 30, 1935.　　C. H. THORDARSON　　1,999,580
DYNAMO ELECTRIC MACHINE
Filed Feb. 16, 1932　　7 Sheets-Sheet 6

INVENTOR.
Chester H. Thordarson,
BY Darby & Darby,
ATTORNEYS.

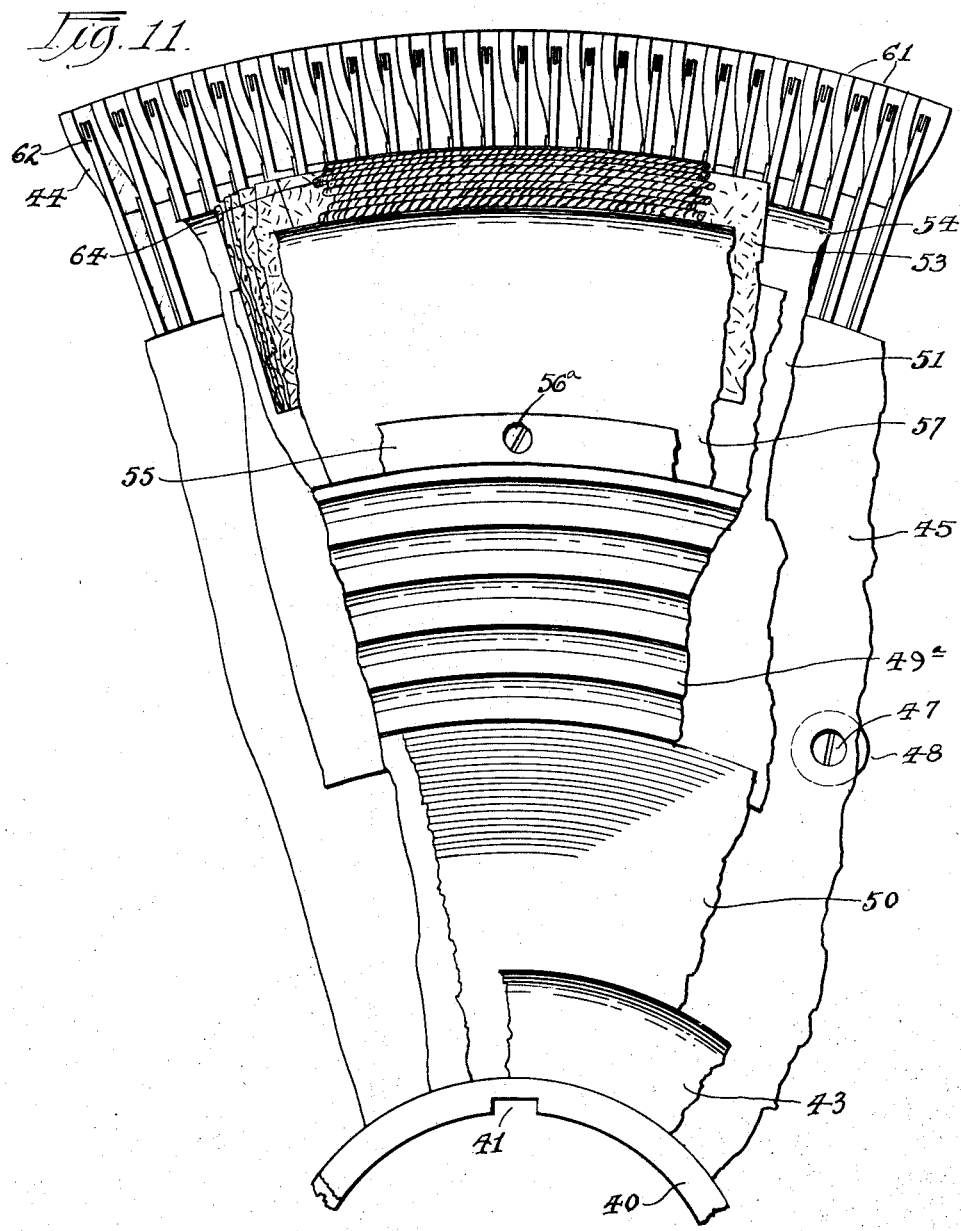

Patented Apr. 30, 1935

1,999,580

UNITED STATES PATENT OFFICE 1,999,580

DYNAMO ELECTRIC MACHINE

Chester H. Thordarson, Chicago, Ill., assignor to Thordarson Electric Manufacturing Company, Chicago, Ill., a corporation of Illinois Application February 16, 1932, Serial No. 593,251

36 Claims. (Cl. 171—209)

This invention relates to electric machines, with particularity to high voltage motors and generators, and is a continuation in part of application Serial No. 106,696, filed May 4, 1926 and issued as Patent No. 1,861,036, dated May 31, 1932.

An object of the invention is to provide an improved type of dynamo electric machine for generating high voltages.

An object of the invention is to provide an efficient machine for generating voltages upwards of 10,000 volts.

Another object of the invention is to provide a direct current machine whether motor or generator, which has a minimum of insulation loss, or conversely, has a maximum of insulation efficiency for a given maximum working voltage.

Another object is to provide a direct current machine wherein means are provided for reducing the width of the air gap between the pole pieces and the armature without correspondingly increasing the chances of breakdown and without correspondingly increasing insulation losses.

Another object is to provide means for reducing the "leakage current" losses in the insulation of a high voltage machine, and also for reducing the "surface creepage" losses.

In electric machines in general, it is highly desirable that the air gap between the armature and pole pieces be at a minimum. However, the dimensions of the gap are usually limited and determined by the working voltage of the machine and the desired clearance. In the case of high voltage machines the clearance is ordinarily greater than in low voltage machines because of the greater tendency to disruptive discharge between the armature conductors and the pole pieces proper, which are usually connected to the frame of the machine and grounded.

In accordance with the present invention it is proposed to achieve greater safety against such disruptive discharges, and at the same time reduce insulation losses and "surface creepage" losses, and increase the efficiency by subdividing the gap between the armature proper and the pole pieces into two or more parts, which are separated by an electrical conductive member, shield, or equi-potential surface. This shield is capable of being maintained at a fixed potential difference which is preferably of a value less than the maximum working potential of the machine. As a result of this subdivision of the gap, and as a result of the constant potential difference which is maintained between the armature proper and the pole pieces or frame, the insulation of the armature conductors is subjected to a substantially constant or at least a uniform electrostatic field throughout the entire periphery of the armature. Furthermore, the electrostatic strains which are set up in the insulation between adjacent armature sections are provided with a parallel path to the shield. Consequently at any point in the periphery of the armature the maximum strain to which the armature insulation is subjected is that determined by the potential difference of the shield.

Accordingly one of the important features of the invention resides in the provision of what may be termed an "equal potential" shield between the armature and field of a motor or generator. This shield may also be applied to the commutator or other part of the machine where insulation losses are of importance.

Another feature resides in an "equi-potential" shield for a high voltage machine, which possesses a minimum reluctance to the magnetic flux and a maximum resistance to undesirable current flow, such as eddy currents or the like.

A further feature resides in an electric dynamo having a shield interposed between the armature and field, together with means for maintaining said shield at a potential intermediate the zero and maximum working potentials of the machine.

A further feature relates to an improved armature construction for high voltage machines.

A further feature relates to a dynamo electric machine having an armature insulated from the frame of the machine.

A further feature relates to an improved commutator structure for dynamo electric machines.

A still further feature relates to the novel organization and arrangement of parts which go to make up a highly efficient electric-dynamo machine.

Other features and advantages not specifically enumerated will be apparent after a consideration of the following detail description and the appended claims.

Although broadly considered the invention may be practiced by subdividing the electro-static field between the armature and field, and maintaining at least half of the subdivided field substantially uniform, this latter subdivision is preferably effected by interposing an electro-static shield or equi-potential surface between the armature and pole pieces which shield is preferably, although not necessarily, maintained at a potential half that of the brush potential of the machine.

In the drawings,

Figure 1 represents an end view in elevation, of a machine embodying features of the invention;

Fig. 2 is a plan view showing the armature and commutator mechanism of Fig. 1;

Fig. 3 is a partial sectional view of the apparatus shown in Fig. 2;

Fig. 4 is an enlarged end view of the armature and supporting means therefor;

Fig. 5 is a partial sectional view taken along the line 5—5 of Fig. 4;

Fig. 6 is another detail view showing the manner of supporting and insulating the armature coils;

Fig. 7 is another view showing the arrangement of the armature coils and novel laminated structure co-operating therewith;

Fig. 8 is an enlarged view of a portion of the laminated structure that is used between the armature coil sections;

Fig. 9 is an enlarged sectional view of a portion of the armature showing more in detail the arrangement of the shield according to the invention;

Fig. 11 is a partial end view in elevation of the commutator structure shown in Fig. 10;

Fig. 12 is a schematic diagram illustrating one preferred way of maintaining the "intermediate" potential difference on the shield;

Figs. 13, 14 and 15 are detail views of the commutator bars and spacers;

Fig. 16 is a perspective view of a portion of the armature winding showing one manner of bringing out the coil terminals.

Figure 10:
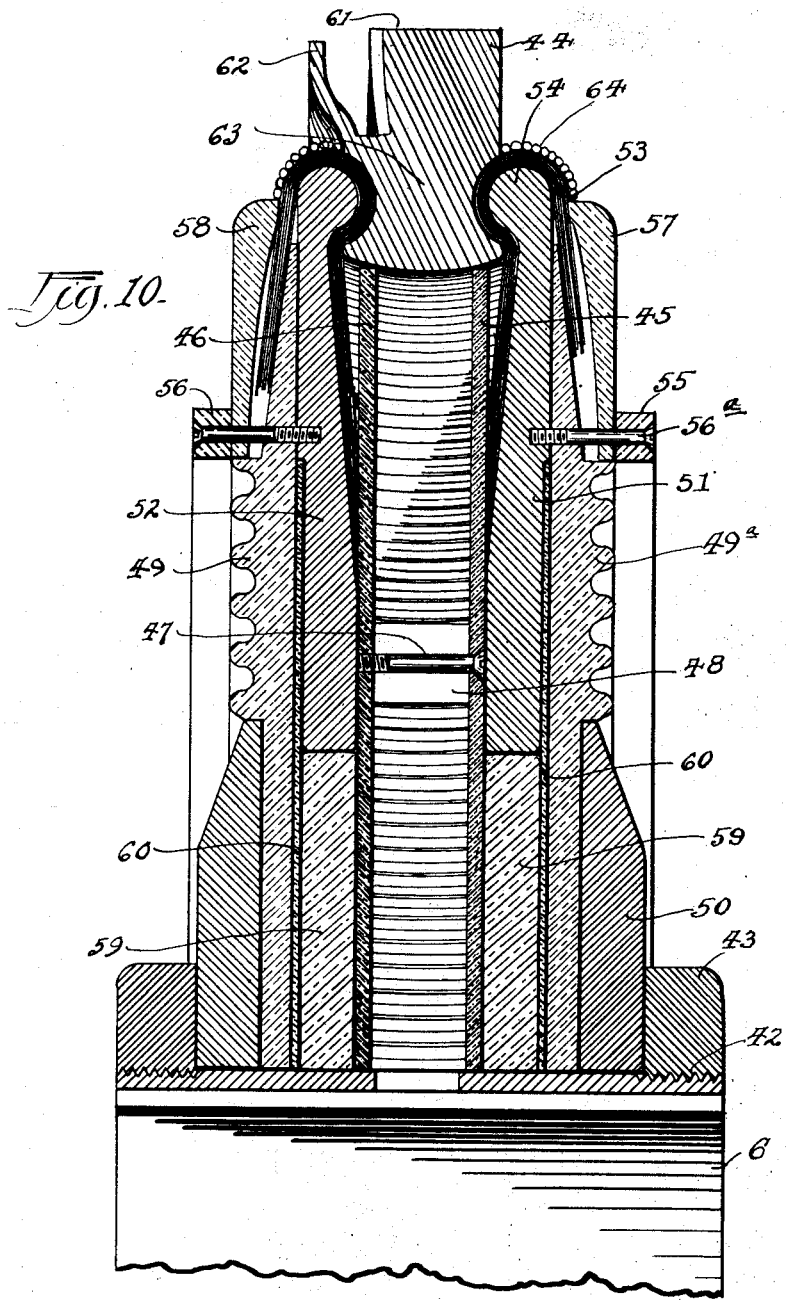
Fig. 10 is a partial sectional view of the commutator structure.

Referring more particularly to Figs. 1 to 4, the numeral 1 represents a base or other suitable standard which carries at opposite ends pedestal members 2 and 3. Each of the members 2 and 3 is provided with any well known type of journal bearing 4, 5, preferably of the anti-friction type, as shown in detail in Figs. 2 and 3. Supported for rotation in the bearings 4 and 5 is the novel armature structure forming part of the present invention. The armature is supported by a cylindrical shaft 6, which has keyed thereto intermediate its ends a pair of tapered blocks 7 and 8. The members 7 and 8 are preferably square or rectangular in cross section, as shown more clearly in Figs. 4 and 9.

For the purpose of firmly holding the members 7 and 8 in the proper position on the shaft the said shaft is threaded as indicated by the numeral 9, to receive the nuts 10 which may be tightened to prevent the members 7 and 8 becoming loose. The shaft 6 is provided with a drive pulley 11 at its left hand end, while intermediate the armature and the pedestal bearing 3 is a fan 12 for creating a current of air through the interior of the armature structure, as the said armature rotates.

The armature proper consists of a series of superposed annular laminations 13, which are rigidly held together in any customary manner, for example by means of tie rods or bolts 14. The annular laminated structure is supported on a pair of spiders 15 and 16, preferably of bronze or other similar material, each of the spiders having a hub 17 with a square opening to fit over the square members 7 and 8 described above. The openings in each of the hub portions 17 is preferably tapered in the opposite direction to the taper of the members 7 and 8, so that as the nuts 10 are tightened the said members 7 and 8 are wedged inwardly towards each other, thus firmly holding the spiders on the shaft 6. In order that the armature may be insulated from the shaft there is provided a sleeve 18, preferably of mica or other high insulating material which completely surrounds the shaft and preferably extends beyond the ends of the armature so as to prevent, or at least reduce to a minimum, the chances of current creepage between the armature and the shaft. The annular laminated structure is fastened in any suitable manner to the spiders 15 and 16, for example, as shown more in detail in Fig. 9, the laminated portion of the armature proper is provided with slots which engage the respective legs of the spiders. Preferably, the exposed surface of the spider as well as the laminated portion of the armature are provided with insulating coverings such as layers of mica, insulating varnish, porcelain or the like, as shown more in detail in Fig. 9 of the drawings.

As shown in Fig. 5 the ends of each of the spider members 15 and 16 are provided with lips or flanges 20 to prevent the laminated armature from moving lengthwise of the shaft 6, and for this purpose the spiders are provided with a series of tie rods 21, the ends of the tie rods being threaded to receive tightening nuts 22 by means of which the laminations may be firmly held between the flanged portions 20 of the spiders. Preferably annular strips of insulation 23 are provided between the ends of the laminated armatures and the flange 20. In order to decrease the chances of current creepage between the armature coils and the laminations there is provided a pile-up of insulation discs at the ends of the lamination. For example, the armature carries at opposite ends thereof a series of rods 24 which support a series of annular strips of fibre or wood 25. The pile-up of strips 25 also serves to support the overhanging ends of the insulating covering 26 which extends around the entire outer periphery of the laminated structure.

The armature is preferably of the ring wound type, preferably also the winding sections are formed from strip metal 26ª. Inasmuch as the machine is shown of the bi-polar type, if a high voltage is to be generated, it is preferable to employ a large number of individual winding sections closely adjacent to each other. Each section of the winding consists of a plurality of convolutions of strip metal preferably wound in the same plane, the adjacent convolutions being separated by a layer or layers of suitable insulation. For the purpose of insulating the individual winding sections from each other and from the core, the said sections are provided with insulating coverings 27 and 28. For example, the portion of the insulating covering 27 may be in the form of a channel of insulation to receive the respective section of the winding, and another channel of insulating material 28 is adapted to fit over the corresponding member 27 to completely enclose and insulate the winding sections from the core, and from each other. It will be understood, of course, that any other well known manner of insulating the coil sections from the laminated core, may be employed. Extending longitudinally along the core between the adjacent coil sections are a series of laminated metal strips 29 of silica iron or other similar magnetic material. Inasmuch as the spacing between the individual adjacent sections of the winding is very small, ordinary laminated structures are impractical, and for this reason it is preferred to make each of the laminated members 29 out of a single strip of corrugated magnetic material with the corrugations flattened to bring them in contact with each other, as described in detail and claimed in copending application, Serial No. 533,391, filed April 28, 1931 and shown in Figs. 7 and 8 of the drawings.

For the purpose of firmly holding the coils and laminated members 29 in position as a rigid unit, strips of fibre 30, or other insulating material, may be forced between the members 29 and the coil sections. It will be understood, of course that the coil sections will be connected together in any suitable manner well known in the art of designing ring wound armature structures.

Wrapped around the entire outer periphery of the armature is a layer of insulation 31. This insulation is preferably in the form of a cylinder of mica which closely fits around the wound armature, the said cylinder preferably extending beyond the ends of the laminated armature structure, so as to reduce chances of creepage between the windings and the laminated core.

For the purpose of reducing the insulation losses in the armature insulation there is provided an annular electro-static shield or "equi-potential surface" around the armature. While this shield may take the form of a cylinder or its equivalent, it is preferred, in the interest of simplicity of design, to achieve the shielding effect by means of a continuous wire 32 which is helically wrapped around the insulation layer 31. Thus for example, as shown more clearly in Fig. 5, the wire shield 32 is wound so that the wire forms spaced groups of turns, it having been found unnecessary to completely cover the outer periphery of the armature with the metallic shield. Suffice it to say that the turns are grouped together and are spaced apart a sufficiently small distance to achieve the electrostatic shielding effect of a continuous metal surface.

Preferably another layer of insulation 33 may be wrapped around the armature and an additional series of bands of wires 34 may be fastened around the member 33 for the purpose of binding together the several layers of insulation and preventing their loosening by the centrifugal force as the armature rotates.

Preferably, also the wire 32 is of the minimum thickness or diameter consistent with the proper design of the machine. In other words, so far as the electro-static shielding effect is concerned the wire 32 (or electro-static shield) can be of inappreciable thickness. However, there will be a certain amount of unavoidable eddy current induced in the shield, and in this respect the making of the shield out of thin wire or metal has the desirable advantage of offering the maximum amount of impedance to the eddy currents as compared with an ordinary cylinder or helically wound metal strip. Furthermore, the thin wire or metal shield offers very litle impedance to the magnetic flux.

The armature, provided with an electro-static shield or equi-potential surface described above, is adapted to rotate adjacent any well known form of field structure. For example, as shown in Fig. 1, the field comprises a pair of poles 35 and 36, whose edges are preferably tapered in the manner shown to more uniformly distribute the flux over the major periphery of the armature. The poles 35 and 36 may be constructed out of any well known magnetic material, and are supported in the frame or yoke member 37, to which they are fastened by means of suitable bolts 38. For the purpose of energizing the field any well known form of field winding 39 may be provided. Preferably, although not necessarily, the frame of the machine is grounded as schematically illustrated in Fig. 12.

The preferred construction of commutator to be used with the armature is shown in detail in Figs. 10 to 15. This commutator structure comprises an annular metal hub 40, which is provided with a keyway 41 for keying the said hub to the shaft 6. The outer ends of the hub 40 are threaded as indicated by the numeral 42 to receive the metallic clamping rings 43 for rigidly holding the commutator assembly together as a unit on the shaft. The commutator bars 44 are supported on the outer edges of a pair of insulator rings or discs 45, 46, of bakelite or other similar insulating material. The discs 45 and 46 are fastened together in proper spaced relation by means of a series of bolts 47 and spacer members 48 through which the said bolts pass. Also mounted on the hub 40 are another pair of insulator discs 49 and 49ª of bakelite, glass or other suitable insulating material. Preferably the members 49 and 49ª have their exposed faces channeled or corrugated to increase the discharge path in accordance with accepted engineering practice. Mounted respectively between the discs 45, 49ª and the discs 46, 49, are annular metallic rings 51 and 52 of steel or other suitable material. Likewise, between the members 43 and the discs 49, 49ª, are metal rings 50.

For the purpose of insulating the commutator bars 44 from the rings 51 and 52, there are provided superposed layers of insulating material such as mica or micanite, indicated in Figs. 10 and 11 by the numeral 53. Preferably the insulation 53 is in the form of superposed strips of mica or insulating cloth. It will be noted that the outer circular edge of the rings 51 and 52 are provided with lips or beads 54 and that the commutator bars 44 are correspondingly cut away to correspond to the curvature of the beads 54. The rims 54 of the rings 51, 52 are adapted to be clamped against the insulation 53 by means of rings 55, 56, and rings 57, 58; the latter rings being preferably of bakelite and fastened to the rings 51 and 52 by screws 56ª. As the rings 55 and 56 are tightened the insulation 53 is clamped between the commutator bars and the rims 54, thus maintaining the commutator assembly together, as a rigid unit. In order to properly hold the insulation strips 53 in position there are provided the two rings of insulation 57 and 58 which are of slightly greater diameter than the rings 49 and 49ª, so that when the screws 56ª are tightened the rings 57 and 58 grip the insulation strips 53 and the said strips are thus firmly held between the edges of the said rings 49 and 49ª and the rings 57 and 58. This method of clamping the insulation causes the same to be uniformly tensioned between the commutator bars and the rings 54, and at the same time provides a rigid assembly which is capable of accurate assembly adjustment. If desired, bakelite compound or other insulating material 59 may be used to fill the spaces below rings 51 and 52 and discs of mica 60 may be interposed between the rings 49ª and 51 and the rings 49 and 52.

Preferably the commutator bars 44 are made of copper or other conducting material ordinarily employed for this purpose, and it is preferred to assemble the bars so that their exposed contactor surfaces 61 are at an angle to the axis of the machine, as shown clearly in Figs. 2 and 3. Each of the commutator bars 44 is provided with a connecting lug 62, preferably in the same plane as the portion 63 of the commutator bar, the upper portions of each commutator bar, however, being bent at an angle, it being understood, of course, that the adjacent commutator bars are separated from each other by suitable insulating spacers 44a in accordance with the usual practice.

In order to properly hold the insulation layers 53 in place and prevent their wearing or flaking, these layers are provided with a binding covering of suitable material such as insulating fabric or cord 64.

One of the important practical features of the above described arrangement of commutators is this that the commutator bars being at an angle to the axis of rotation and the brushes 65 being substantially parallel to the axis of rotation the spark or arc that may be formed is at an angle to the machine axis. Consequently because of the disposition of the fan blades 12 a current of air is blown through the interior of the armature and thus blows the arc outwardly from the commutator. It has been found that this particular arrangement of commutator bars and fan reduces the chances of break-down due to the commutator sparking and effects a more rapid extinction of the arc or spark at the commutator.

A machine constructed as disclosed above, when used as a generator, is capable of generating extremely high voltages of direct current without requiring any unusual or expensive insulation for the armature conductors since the electrostatic shields interposed between the armature and fields effectively reduce the maximum potential stress on the armature insulation. As a matter of fact, if the shield formed by the wires 32 is disposed uniformly along the length of the armature, and if the magnetic field is likewise substantially uniform, then the shield will of itself assume a potential which is one-half the maximum brush potential. However, instead of relying upon the inherent action of the machine to maintain the shield at the intermediate potential value, other means may be provided for positively maintaining the said shield at any predetermined potential. For example, a resistance or impedance, preferably non-inductive, may be connected across the brushes and the shield may be adjustably connected to this impedance, preferably at the midpoint thereof so that the shield assumes half the brush potential, as shown schematically in Fig. 12. However, it has been found that this additional connection is not absolutely necessary and that the shield of itself in assuming its inherent potential acts to reduce the maximum electro-static strain on the insulation of the armature.

While the customary materials may be used in the manufacture of the various parts of the machine described above, it is preferred to make the electro-static shields out of a material which has a high resistance to eddy-currents or the like, but which at the same time offers a minimum of impedance to the magnetic flux. For example, a material such as silica iron may be used for these shields.

Furthermore, it will be understood that various modifications and changes may be made in the machine without departing from the spirit and scope of the invention. Furthermore, while a bi-polar machine has been shown, it will be understood that any other number of poles may be employed, and likewise while the machine has been described above as a generator, it will be obvious that it can be used with corresponding advantages as a motor.

What is claimed is:

1. An electrical machine of the character described, comprising an armature, a field pole member for said armature, an impedance connected across the terminals of said machine, a shield between said armature and pole member, and a connection from said impedance to said shield.

2. An electrical machine according to claim 1 in which the impedance is in the form of a non-inductive resistance.

3. An electric machine according to claim 1, in which the shield is connected to a point on said impedance whereby said shield is maintained at a potential difference midway between the terminal potential difference and the machine.

4. An electric machine of the character described comprising an armature, a field pole member for said armature, an impedance connected across the terminals of said machine, and an adjustable connection from said impedance to said shield.

5. An electric machine of the character described comprising an armature, a field pole structure for said armature, and a metal wall forming an electro-static shield between said armature and pole structure, said shield being carried by said armature.

6. An electric machine according to claim 5 in which the shield is maintained at a potential difference intermediate the brush potential of the machine.

7. An electric machine according to claim 5, in which the shield is in the form of a series of thin metal bands wrapped around the armature.

8. An electric machine according to claim 5, in which the shield has very small cross sections and offers high resistance to current flow.

9. An electric machine according to claim 5, in which the shield is in the form of a fine wire helically wound around said armature.

10. An electric machine according to claim 5 in which the shield is of silica iron.

11. A machine of the character described comprising an armature, a field pole member, a metallic electrostatic shield between said armature and field pole member, a commutator, means for insulating the commutator parts from the frame of the machine, and a metallic electrostatic shield for said insulating means.

12. A machine according to claim 11, in which both said shields are maintained at a potential difference which is less than the maximum brush potential of the machine.

13. A machine according to claim 11, in which a non-inductive potentiometer is connected across the brushes of the machine, and an adjustable electrical connection is provided from said potentiometer to both of said shields.

14. A machine of the character described comprising an armature, a field pole member, a commutator, means for insulating the commutator parts from the frame of the machine, and means for limiting the maximum potential stress on said insulation to half the terminal potential difference of the machine.

15. A machine of the character described, comprising an armature, a field pole member, insulated windings on the armature, and means carried by the armature for limiting the maximum potential stress on said insulation to approximately one-half the brush potential of the machine.

16. A machine of the character described, comprising a shaft, an armature carried by said shaft and insulated therefrom, and an electro-static shield carried by the armature for limiting the maximum potential stress on the armature insulation to a value less than the maximum brush potential.

17. A machine of the character described comprising a grounded shaft, an armature supported on said shaft but insulated therefrom, a grounded field structure, and means carried by the armature for limiting the maximum potential stress on the armature insulation to a value less than the maximum brush potential.

18. A machine of the character described comprising an armature core, a plurality of winding sections in the form of flat metal strips carried by said armature, means for insulating said sections from the core, and an electro-static shield surrounding all the said coil sections to limit the maximum potential stress on the said insulation to a value less than the maximum brush potential of the machine.

19. A machine of the character described comprising an armature core in the form of a pile-up of annular laminations, means for insulating substantially the entire surface of said core, a plurality of winding sections in the form of insulated metallic ribbon wound around the core, and an electro-static shield surrounding all said coils for controlling the maximum potential stress on said insulation.

20. A machine of the character described comprising a shaft, a pair of spiders insulatingly mounted on said shaft, the exposed surface of said spiders being provided with an insulating covering, a laminated core supported by said spiders, an insulating covering for said core, a plurality of coil sections wound around said core, and a metallic shield surrounding all said coils but insulated therefrom.

21. A machine of the character described comprising a shaft, an armature insulatingly carried by said shaft, a ribbon winding for said armature, an electro-static shield surrounding said armature, a potentiometer connected across the terminals of said machine, and an electrical connection from said potentiometer to said shield.

22. A machine of the character described comprising a shaft, an annular laminated core, means for insulating said core from said shaft comprising a tubular strip of insulation surrounding said shaft and extending beyond the ends of said core, and a metallic electro-static shield on the outer periphery of said core.

23. A machine of the character described comprising a shaft, an armature core supported by said shaft, a tubular insulating member surrounding said shaft between the shaft and the armature, a tubular insulating member adjacent the inner periphery of said annular core, a tubular insulating member adjacent the outer periphery of said core, a ring winding for said core, and a tubular electro-static shield surrounding said core winding and adapted to be maintained at a potential difference intermediate the maximum and minimum working potentials of the machine.

24. A machine according to claim 23 in which the shield is in the form of a band wound helically around the core.

25. A machine of the character described comprising a shaft, a pair of spiders having hub portions with rectangular bores, a pair of blocks slidably mounted on said shaft, the inner faces of said bores and the outer faces of said blocks being inclined, means for wedging said blocks between said shaft and said hubs, an insulating member between said blocks and said hubs, an annular laminated core supported by said spiders, the inner and outer peripheries of said core being provided with an insulating covering, ribbon coils wound around said core, and a metallic electro-static shield surrounding said coils.

26. A machine of the character described comprising an armature, a shaft therefor, and a commutator, said commutator comprising a plurality of commutator bars, means for insulatingly mounting said bars on said shaft, guard rings for said insulation, means for insulating said rings from said bars, and means for limiting the maximum potential stress on said insulation to a value less than the maximum working potential of the machine.

27. A machine according to claim 26, in which the means for limiting the maximum potential stress on said insulation also serves to limit the potential stress on the armature insulation.

28. An armature structure comprising a hollow cylindrical core, a plurality of coils wound around said core, armature teeth between adjacent coils, said teeth comprising transversely folded magnetically permeable material.

29. An armature structure comprising a hollow cylindrical core, a plurality of coils wound in radial balance around the core, and strips of transversely folded magnetically permeable material for spacing the coils about the periphery of the core and for continuing the magnetic circuit from the core.

30. An armature structure comprising a magnetically permeable core, a plurality of ribbon coils wound on the core, and corrugated strips of magnetically permeable material for spacing the coils about on the periphery of the core and for completing the magnetic circuit to the core.

31. An armature structure comprising a hollow laminated magnetic core, a series of ribbon coils ring wound around said core, a wrapping of insulation surrounding all said coils, metallic bands helically wound around said layer of insulation, another layer of insulation wrapped around said metallic bands, and a second set of metallic bands helically wrapped around said second layer of insulation.

32. An armature structure comprising a hollow laminated magnetic core, a series of ribbon windings ring wound around said core, and a covering for said core comprising alternate layers of insulation and metallic bands.

33. An armature structure comprising a laminated core and armature teeth in the form of corrugated strips of magnetic material supported on the outer periphery of said core.

34. An armature structure according to claim 33 in which the armature teeth are formed out of a flattened corrugated magnetic material.

35. An armature structure including an annular hollow magnetic core, insulation disposed on the outer and inner faces of the core, a plurality of insulated coils surrounding said core and insulation, strips of magnetic material interposed between each pair of adjacent coils, and an electrostatic shield surrounding said coils.

36. An armature structure comprising a laminated hollow core, substantially the entire exposed surface of said core being provided with an insulating covering, a plurality of ribbon coils ring wound around said core, and a strip of corrugated magnetic laminations and a strip of insulating material interposed between each pair of adjacent coils.

CHESTER H. THORDARSON.